US00RE45393E

(19) United States
(12) Reissued Patent
Turney

(10) Patent Number: US RE45,393 E
(45) Date of Reissued Patent: Mar. 3, 2015

(54) GREEN MEANS 4 KIDS ATTIRE

(71) Applicant: Cristi Turney, Sandersville, GA (US)

(72) Inventor: Cristi Turney, Sandersville, GA (US)

(21) Appl. No.: 13/968,904

(22) Filed: Aug. 16, 2013

Related U.S. Patent Documents

Reissue of:
(64) Patent No.: 8,001,617
Issued: Aug. 23, 2011
Appl. No.: 12/322,285
Filed: Jan. 30, 2009

U.S. Applications:
(63) Continuation-in-part of application No. 12/004,851, filed on Dec. 21, 2007, now abandoned.

(51) Int. Cl.
*A41D 11/00* (2006.01)

(52) U.S. Cl.
USPC ..... 2/75; 2/1

(58) Field of Classification Search
USPC ..... 2/111, 75, 76, 96, 218, 219, 221, 237; 450/18, 25, 77, 134, 135, 137; 33/17 R
See application file for complete search history.

(56) References Cited

U.S. PATENT DOCUMENTS 2,636,176 A * 4/1953 Ross ..... 2/93
2,747,197 A * 5/1956 Bailey ..... 2/211
3,094,703 A * 6/1963 Bailey ..... 2/96
3,106,719 A * 10/1963 Rosenfeld ..... 2/116
3,116,491 A * 1/1964 Previdi et al. ..... 2/106
3,793,645 A * 2/1974 Kadison ..... 2/221
3,997,982 A * 12/1976 Holland ..... 434/260
4,494,248 A * 1/1985 Holder ..... 2/69
4,580,298 A * 4/1986 Tuisl ..... 2/237
4,683,595 A * 8/1987 Cash ..... 2/105
4,803,740 A * 2/1989 Dawson ..... 2/215
5,842,230 A * 12/1998 Laudick ..... 2/69
6,219,848 B1 * 4/2001 Russell ..... 2/221

* cited by examiner

*Primary Examiner* — Richale Quinn
(74) *Attorney, Agent, or Firm* — Ballard Spahr LLP

(57) ABSTRACT

The following information relates to new process of recycling garments. Although the concept of recycling garments is not new, the new process and the results of those process are both new and unexpected. Rarely is the recycling of garments as practical and as easy as the process to be presented. Additionally, these process of recycling can enable apparel manufacturers, sewing boutiques, and even home sewers, to save money and time. Benefits include sewing as little as possible while having the effect that much sewing has taken place. Another gain includes the prospect of recycling garments that failed quality control inspections due to slight imperfections. By utilizing the new process, a marketable children's apparel line can emerge, from what would normally be a loss. Consider the benefits of a new children's apparel line almost completely sewn before the recycling process begin.

20 Claims, 16 Drawing Sheets

GREEN MEANS 4 KIDS ATTIRE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Ss 171 (d) (e), Applicant, Cristi Cannon Turney, citizen of the United States, requests current application be a *reissue application of Ser. No. 12/322,285 filed Jan. 30, 2009, which is a* continuation in part of application Ser. No. 12/004,851 filed Dec. 21, 2007 *now abandoned*, for Green Means 4 Kids Attire by present applicant, Cristi Cannon Turney which claims the benefit of: application Ser. No. 11/521,646 filed Sep. 15, 2006, for Child's Clothing Ensemble by present applicant, Cristi Cannon Turney which claims the benefit of: Provisional patent application No. 60/717,320 filed Sep. 15, 2005 for Recycled Child's Outfit by the present applicant, Cristi Cannon Turney; patent application Ser. No. 11/487,035 filed Jul. 14, 2006 for Adjustable Multi-sized Garment Closure by present applicant, Cristi Cannon Turney; Provisional patent application No. 60/699,358 filed for Multi-size Adjustable Button Waistband by current applicant, Cristi Cannon Turney. Applicant, Cristi Cannon Turney, repeats a substantial portion of said application Ser. No. 11/521,646 filed Sep. 14, 2006, Ser. No. 60/717,320 filed Sep. 15, 2005, Ser. No. 11/487,035 Filed Jul. 14, 2006, Ser. No. 60/699,358 filed Jul. 14, 2005 and adds and claims additional disclosure not present in the prior applications.

STATEMENT REGARDING FEDERALLY SPONSORED RESEARCH OR DEVELOPMENT

Not Applicable

THE NAMES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present discovery generally relates to an improved process of recycling existing garments and or garment parts, for the production of marketable smaller garments and garment related wear. Said process of recycling garments contains several processes that can be performed simultaneously, or in part, as opportunity for recycling presents itself. Although home sewers would greatly benefit from said recycling process, petitioner directs said improved process of recycling toward the garment manufacturing sector. Said process of recycling garments is ideal for creating capital from what would otherwise be corporation loss.

2. Description of Related Art

Present petitioner owns U.S. D465,316 S which illustrates one preferred embodiment of said process of garment recycling. After entering the USPTO Web site, petitioner was able to view the References Cited in said design patent number: U.S. D465,316 S. Only three of the cited references were related to children's clothing. None of the citings were similar to the varied embodiments created from employing said improved process of recycling garments. In essence, nearly all of the embodiments of said process of recycling look nearly like ordinary children's clothing. End products of said process of recycling garments include but are not limited to: outer wear; day wear; sleep wear; shirts; pants; shorts; pinafores; dresses; hats; accessories; including embodiment sets, having a top and bottom that detachably fasten by means of button or snap detachable fasteners.

RE8,093 E, by Woodward was created for men's overalls.

U.S. Pat. No. 1,204,719 A, by Van Husen was in connection with ladies wear.

U.S. Pat. No. 1,367,182 A, by Gardi has an adjustable waist for ladies active wear.

U.S. Pat. No. 1,405,405 A by Gendel was well presented and pleasant to the eyes. It however, only pertained to children's outer wear.

U.S. Pat. No. 1,476,831 A, by Pease was very nice. Complexity of Pease's invention creates a doubt of convenience.

U.S. Pat. No. 2,252,884 A, Mr. Fellroth was a very clever man also. Petitioner especially liked his drop seat pants. In order for petitioners embodiment sets to be fully functional, petitioner searched for a pattern or template that would accommodate drop seat pants. Mr. Fellroths invention helped petitioner see that an actual pattern was not needed. A simple slit at the hip/side accomplished by means of cutting and finishing, creates the drop down effect.

After searching for similar processes of garment recycling in old sewing manuals, petitioner found pertinent information on pages 240-248 of The New Encyclopedia of Modern Sewing, copyright 1948 by WM. H. Wise and CO., Inc. The boys blouse on page 243 shows how petitioner currently places a front, back, side, or shoulder pattern piece in order to utilize the placket on nearly any recyclable garment. With the exception of the ladies jacket pages 245-248, particularly LAYOUT No. 1, petitioner noticed that pattern placement illustrations on pages 241-243 do not include the practice of utilizing existing plackets. In addition, current petitioner uses sleeves for pants, bloomers, shorts, diaper covers, and the like. Furthermore, petitioner is persuaded that most layman would not perceive what they were viewing. Current petitioner has a trained eye for how, why, and in what order a pattern should be placed on a garment for the purpose of recycling said garment. Petitioner found this information Sep. 6, 2006. As an aside, perhaps the only reason petitioner spotted the boys blouse pattern layout on page 243, is because said petitioner noticed the concept on page 247 under the heading: HOW TO MAKE A MANS SUIT INTO A WOMANS SUIT. Petitioner reread pages of said book, pages 245-248 Dec. 13, 2007. Page 247 illustrates a ladies suit made from a mans suit. The lapel closes from the left indicating LAYOUT No. 1 does disclose a portion of one of petitioners process of recycling garments. The only reason petitioner gained a full understanding of said disclosure is because of the lap of the suit illustrated on page 247.

Clearly, petitioners process of recycling garments accomplishes considerably more than previous inventions or processes cited. Petitioner concludes that a current, consistently successful, process of recycling garments, whether at the manufacturing level or that of the home sewer, has not been established.

BRIEF SUMMARY OF THE INVENTION

Figure 1:
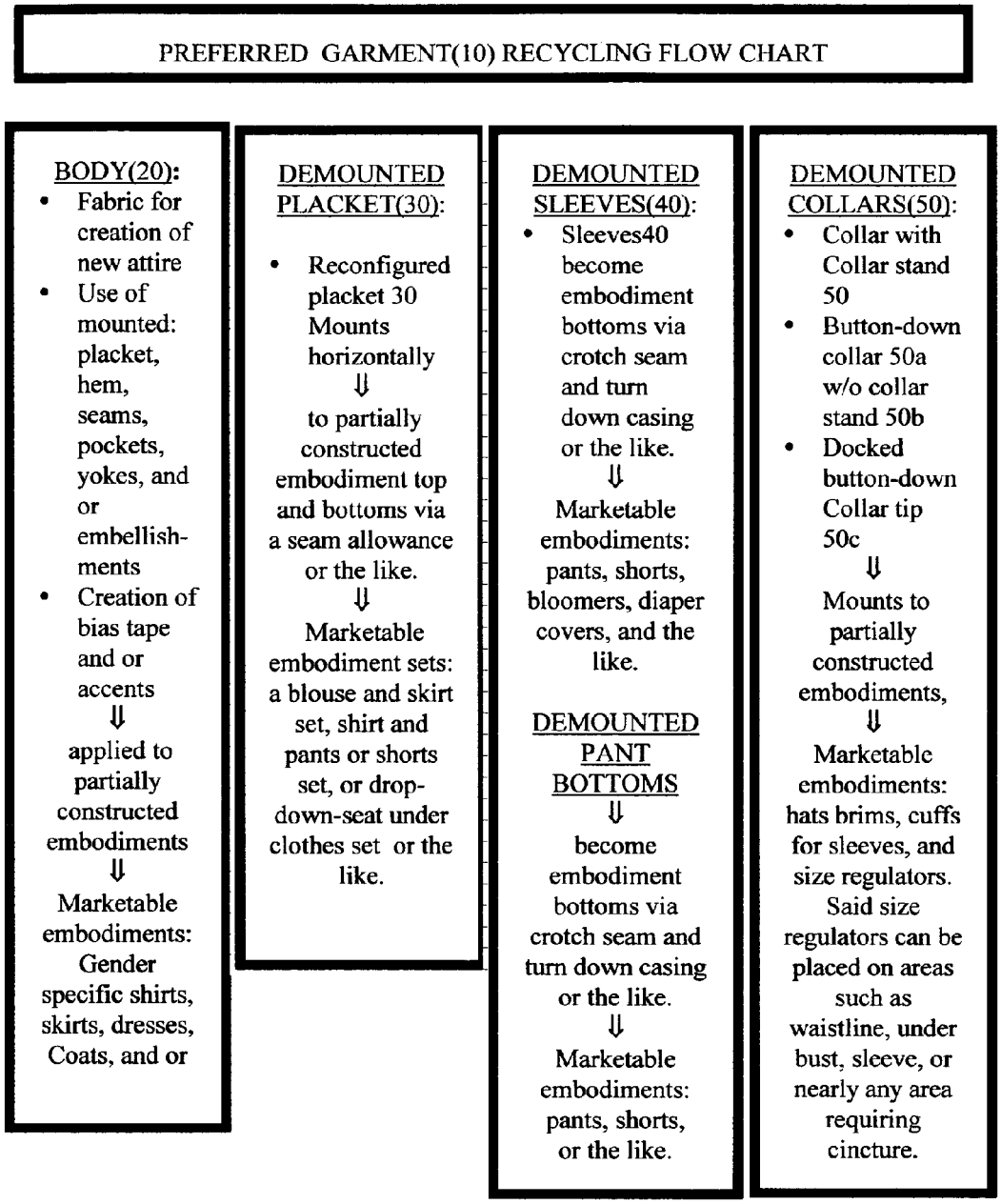
FIG. 1 shows an abbreviated flow chart of applicants method of recycling garments.

The following information relates to a new improved process of recycling garments. Nearly any garment is good for recycling into smaller clothing, hats and or accessories. Although the concept of recycling garments is not new, the results of employing said improved process of recycling garments are both new and unexpected. FIG. 1 provides an abbreviated flow chart of possible avenues of recycling garments.

Over decades, there has been a need in the garment/fashion industry for an improved process of recycling garments and the like. By adopting petitioners improved process of recycling garments, prospective companies will reduce waste on the manufacturing level, reducing overhead, while satisfying customers with a new product line created from said improved process of recycling garments. New products will lead to an increase in new customers expanding the customer base as a whole. Petitioners improved process of recycling garments establishes a win/win solution to what would otherwise be company losses.

It is an object of the present invention to sew as little as possible while having the appearance the much sewing has taken place.

It is a further object of the present invention to capture any detail within said garment to be recycled and apply the same toward said new product.

It is another object of the present invention to reduce waste, on the manufacturing level by providing a recycling method that is practical, simple, time saving, and economic, that consistently results in said new attractive product line, thus creating capital from what would otherwise be corporate loss.

The present process of recycling garments accomplishes these desired objectives by the incorporation petitioners rule: Capitalize on completed work available. When capitalizing on completed work available, the need for constructing said mounted plackets, pockets, seam allowances for the inseam, side seams, and or hem treatments is eliminated because of proper pattern 70 piece or template placement. FIGS. 1, 2, 3, 4, 5, 6, 7, 8, 9, 10, 12, 13, 14, 15, and 16 illustrate the adoption of said rule.

Figure 2:
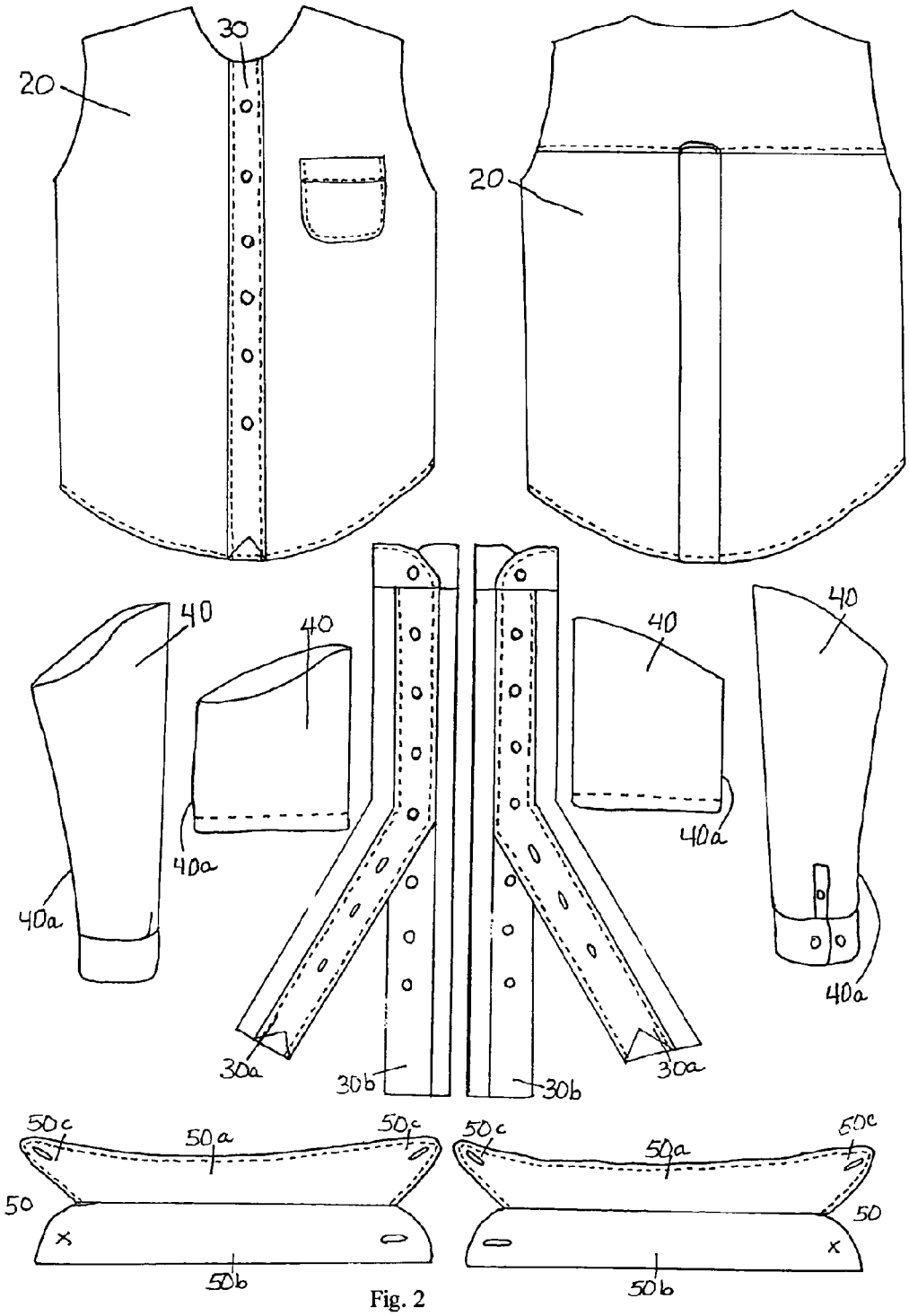
FIG. 2 shows an exploded view representing nearly any garment to be recycled.

FIG. 2 is used to illustrate many garments contain whole individual garment parts having completed work. For instance said garment to be recycled: a body 20 side having a mounted placket 30, with or without a collar stand, a placket-less body 20 side, complementary sleeve pair 40, collar 50, pocket (s), hems, and even seams as found on nearly any garment, are considered completed work that has been applied or mounted to the body of said garment by means of simple seam or the like. By demounting, rearranging, and or re-colligating said whole individual garment parts having completed work, often using the body of said garment to be recycled as the body of the new product, a new product line can be created.

DETAILED DESCRIPTION OF THE DRAWINGS

Begin with Nearly any Garment.

Nearly any garment having a mounted placket 30 body 20 side, with or without a collar stand, contiguous with said garment body 20 is gender specific, thereby perpetually creating gender specific embodiments, or the like. FIG. 2 illustrates the gender of said garment body 20 is determined by the lap of said mounted placket 30 and or collar stand 50b. Hence, the use of shirts, skirts, dresses, coats and the like are included as garments that are good for recycling. Mounted placket 30 placement on said garment body 20 is irrelevant; front, back, side, and or across the shoulders.

Figure 3:
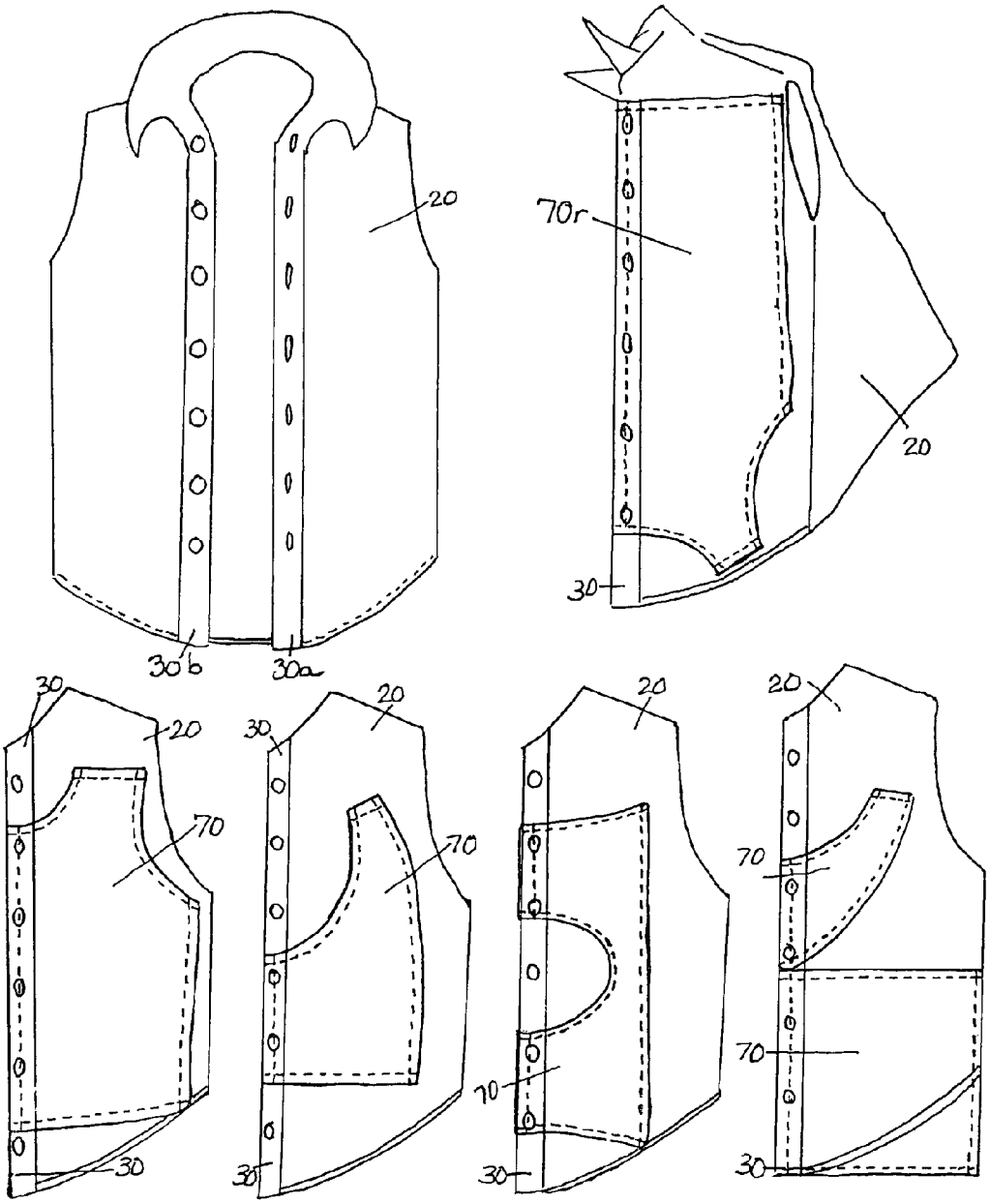
FIG. 3 shows possible pattern placements when utilizing said mounted placket pattern placement.
Figure 4:
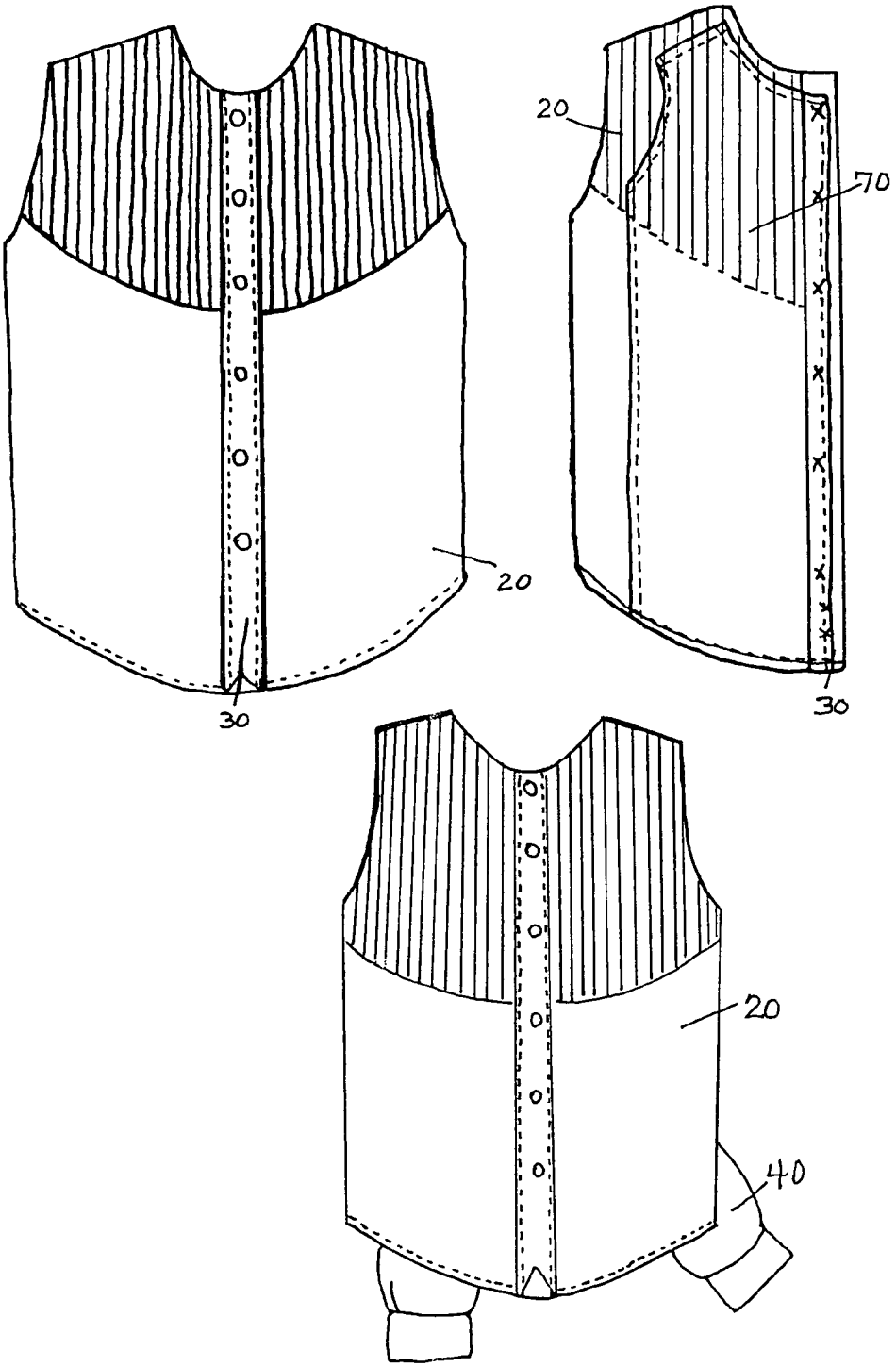
FIG. 4 shows an additional mounted placket pattern placement and resulting embodiment further utilizing completed work available.
Figure 5:
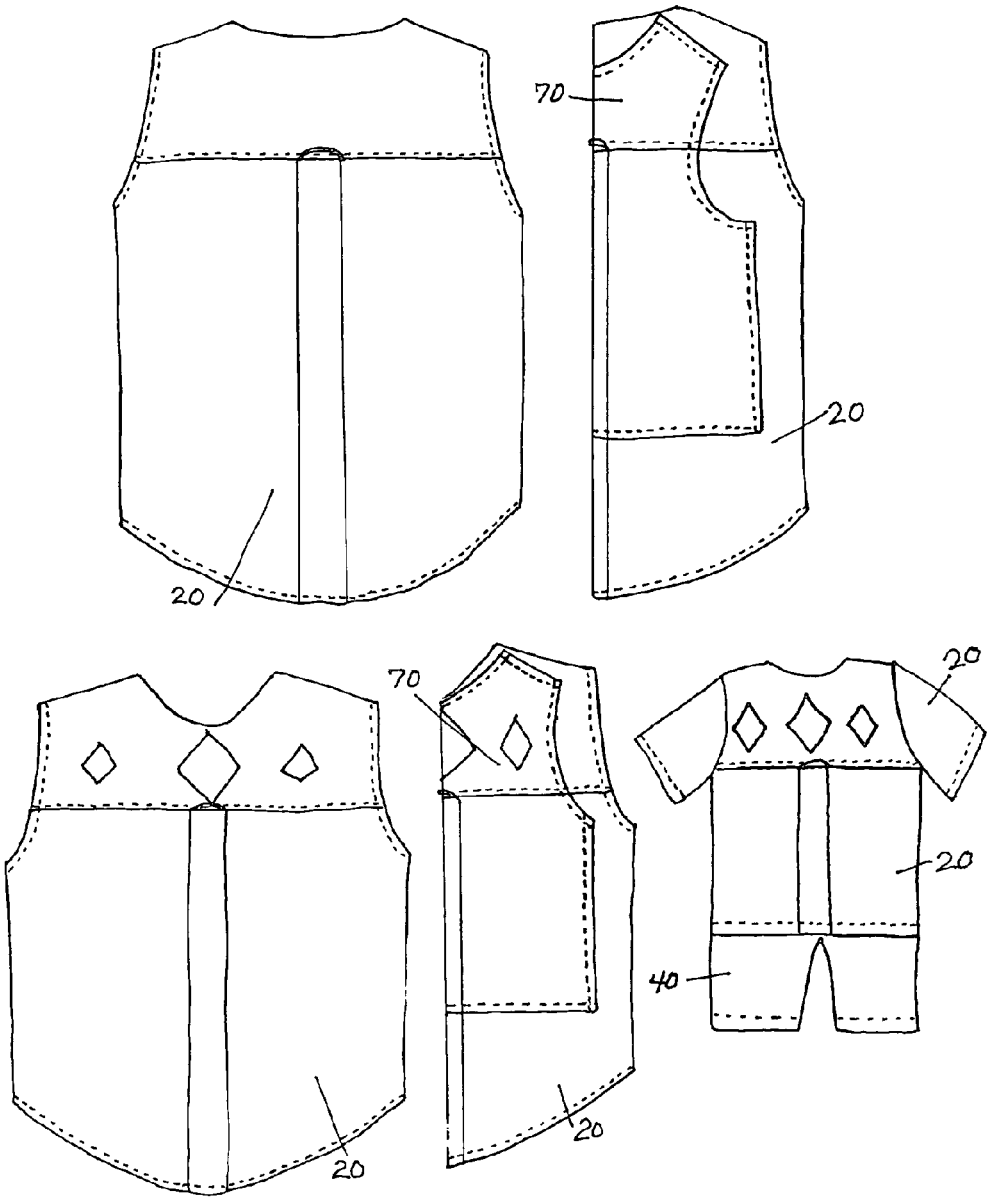
FIG. 5 shows an example of placket-less pattern placement obtaining a portion of completed work available.

Using FIGS. 3 and 4 as guide, the same process of pattern 70 piece or template placement for mounted plackets 30 is correct regardless of what style of embodiment is going to be produced. Whether said mounted placket 30 is a plurality of button or snap detachable fasteners or a zipper, the center line found on said pattern 70 piece or template in combination with the center line of said mounted placket 30 is used as a guide to ensure proper pattern 70 piece or template placement.

Intentionally changing the gender of said garment body 20 is made possible by reversing said pattern 70 piece or template placement. FIG. 3 shows proper placement of said pattern 70r piece or template as bottom side up. Special consideration for nap, one way designs, and pockets must be applied if said pattern 70r piece or template reversal, is used to change the gender of said garment body 20. Said pattern 70r piece or template reversal is very beneficial on large gender specific garment bodies 20, for example a jean skirt, or a soft camel hair coat, where a greeter quantity of embodiments can be produced by implementing said pattern 70r piece or template reversal.

This is VERY important because the concept of pattern 70 piece or template placement is so simple, it is easily misunderstood. In essence, only two pattern piece or template placements are used to created all styles of embodiment tops. The number of embodiment styles created is limited only by the garments being recycled and manufacturers imagination, when adopting said rule: Capitalize on completed work available.

Proper pattern 70 piece or template placement is paramount to capitalizing on said completed work available. Wherein said proper pattern piece or template 70 placement on said mounted placket, with or without a collar stand being contiguous with said garment body 20, is KEY, integral, and most important to consistent success of said process of recycling garments preferably being performed before any other pattern piece or template placement. In reality, the only essential task is making sure said pattern piece or template 70 is placed correctly. Pattern 70 piece or template style, brand, and size are left to the discretion of the reader.

At every stage of said recycling process, usable left over garment body 20 parts can be saved if desired, or put to the side, for future use. By recycling more than one garment body 20 at a time, textures, colors, and accents can be harmonized, enhancing both the performance and appeal of said new embodiments. FIGS. 4, 5, 6, 8, 9, 10, 11, 12, 13, 14, 15, and 16 used left over garment parts to create shorts, sleeves, skirts, accents, and bias binding.

Preferred Manner and Process of Recycling Garments

Figure 6:
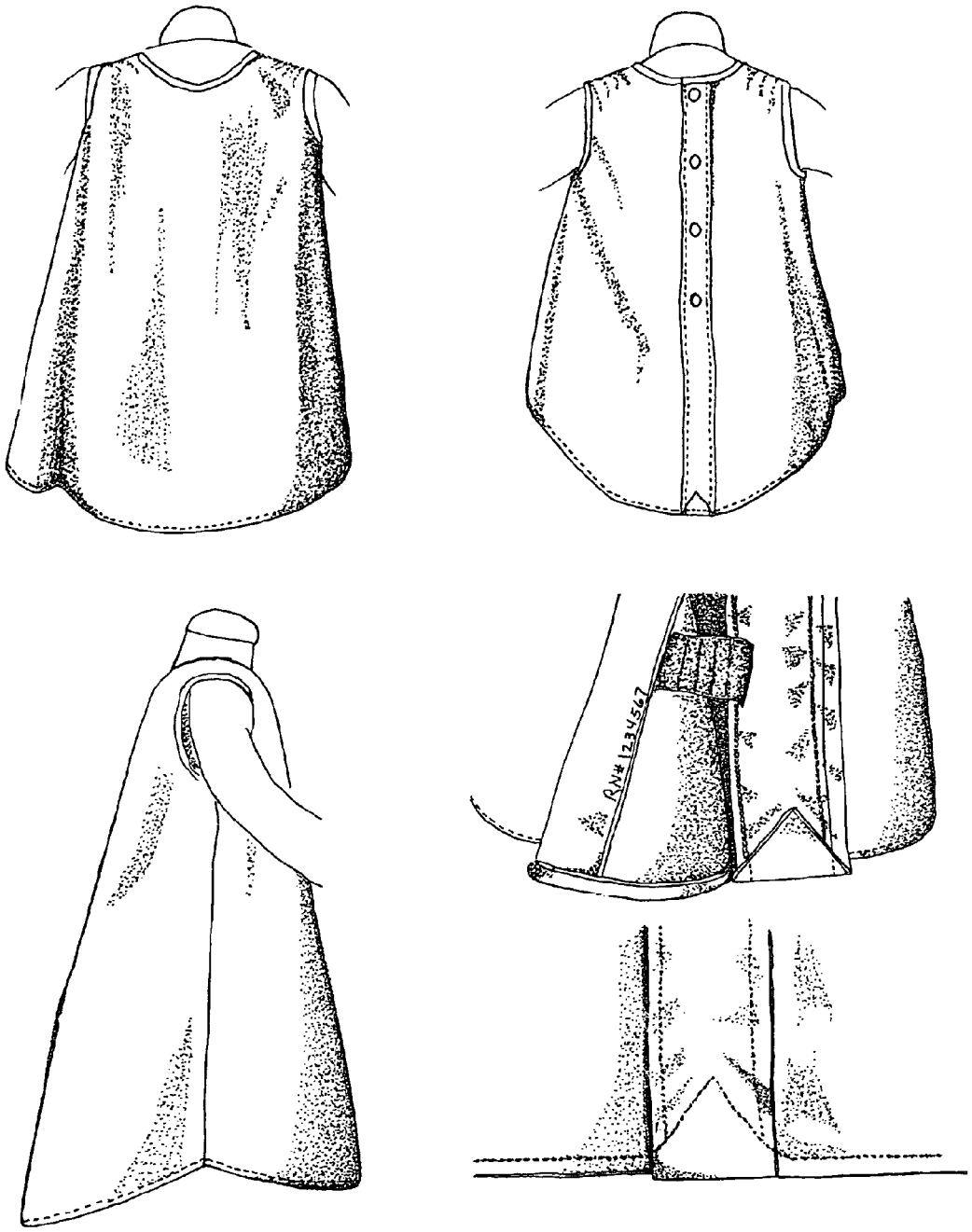
FIG. 6 Shows results of joining mounted placket and placket-less garment body sections using original hems and placket.
Figure 7:
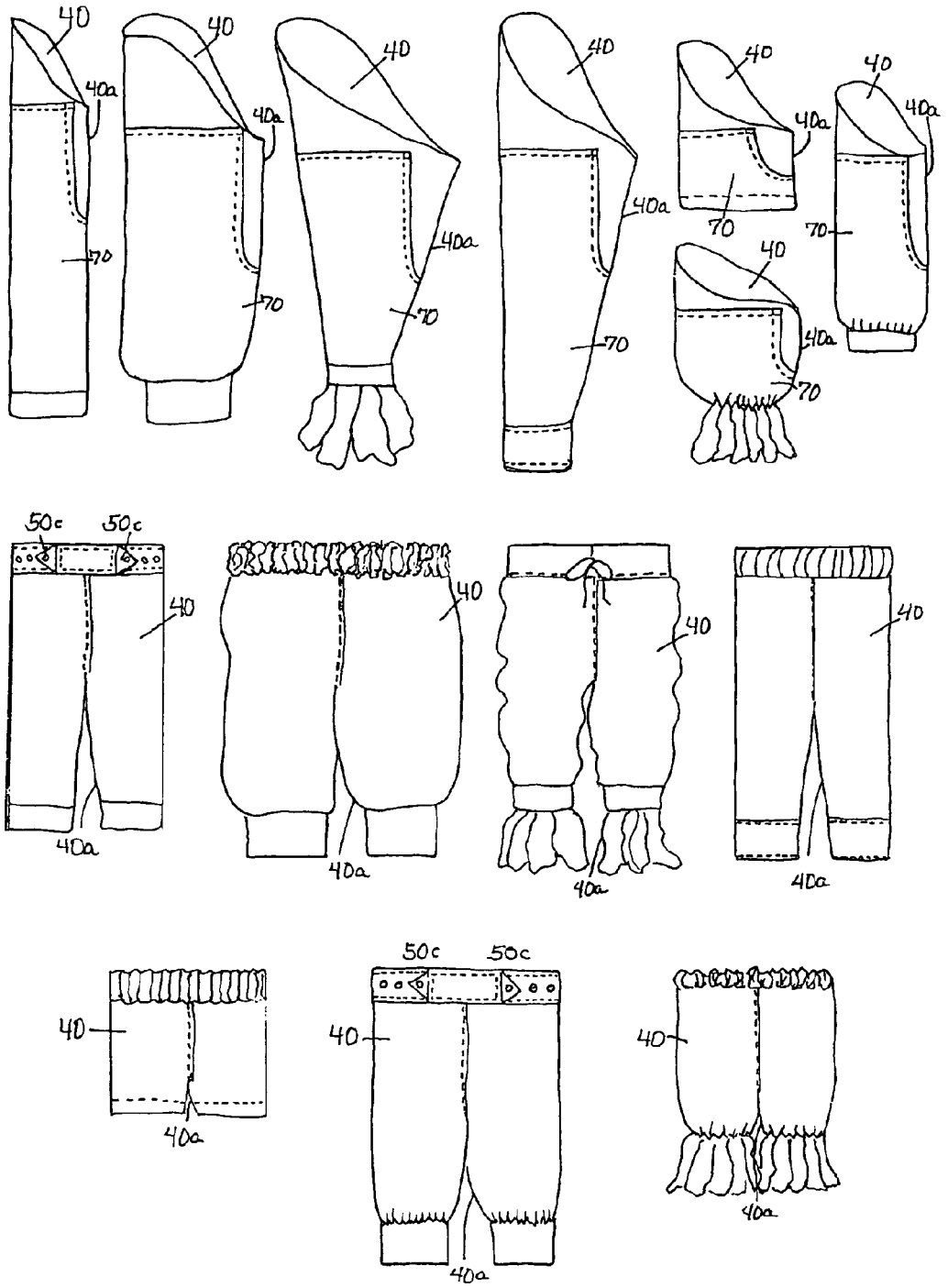
FIG. 7 shows possible pattern placements on nearly any demounted sleeve pair and embodiments thereof.

Embodiment Top:

An Embodiment Top is made possible when two pattern 70 pieces or templates are used as guides, being placed on one body side having a placket and one placket-less body side for the purpose of cutting and re-assembly. Thus, creating two cut body sides ready for re-assembly. Said body sides are joined by predetermined means of colligation at the shoulders and sides. Said Embodiment top fits the trunk of a human body, resembling nearly any shirt, blouse, dress, pinafore, skirt, coat or the like; that is capable of detachably fastening down the front, back, side, shoulder, or the like. FIGS. 4, 5, 6, 8, 9, 12, 13, 14, and 15 show the results of said colligation. FIG. 6 further illustrates the use of existing hems and placket seams with a frontal, back, side and an exploded interior and exterior view of an Embodiment Top.

Mounted Placket Side of Garment Body 20: Use FIGS. 3, and 4, as a Guide:

A. Turn said mounted placket side of garment body 20 inside out.

B. Next, re-button said mounted placket side of garment body 20 placing the rights sides of fabric together.

C. On a cutting surface, smooth said mounted placket side of garment body 20 fabric away from said re-buttoned placket 30 in preparation for said pattern 70 piece or template.

D. Place said pattern 70 piece or template aligning the buttonhole area directly over said re-buttoned placket 30 of mounted placket side of garment body 20, matching center lines if applicable, using FIGS. 3 and 4 as an example. Said pattern piece or template reversal 70r is performed during this step for said gender change of mounted placket side of garment body 20.

E. Cut said mounted placket side of garment body 20 after said proper pattern 70 piece or template placement and set to the side.

Placket-Less Side of Garment Body 20: Use FIG. 5 as a Guide:

F. On a cutting surface, smooth said placket-less side of garment body 20 back having right side of fabric facing out.

G. Center said pattern 70 piece or template in the top back yolk area of said placket-less side of garment body 20.

H. After proper pattern 70 piece or template placement, cut out said placket-less side of garment body 20.

I. colligate the product of step H. to the product of step E. at the shoulders.

J. If desired, obtain sleeve fabric from said garment body 20. Cut and sew a sleeve pair according to said pattern piece or template instructions. Attach said sleeve pair to said product of step I at shoulder seams by means of colligation.

K. Colligate side seams.

L. Hem product of step K if hem was not obtained during said pattern 70 piece or template placement steps C. D. E. and G., and H. of mounted placket body side and placket-less body side of Top. Embodiment Top is now complete.

Embodiment Bottoms: Use FIG. 7 as a Guide.

An Embodiment Bottom is made possible when a pattern 70 piece or template is placed on a complementary pair of prepared demounted sleeves and used as a guide for cutting and re-assembly. Thus, creating two cut sleeve sides that are joined by predetermined means of colligation at the crotch curve. Embodiment Bottoms fit the trunk of a human body resembling nearly any pants, shorts, bloomers, diaper covers, pantaloons, and the like. FIGS. 4, 5, 7, 8, 11, 12, 13, 14, and 15 show the results of reconfiguring demounted sleeves.

Embodiment Bottoms: Use FIG. 7 as an Example:

A. Demount sleeve pair 40 from said garment Body 20 by means of docking or cutting.

B. Iron said demounted sleeve pair 40 flat beginning at demounted sleeve inseams (40a) and pressing outward toward the back in the same manner a dry cleaners would place a crease in a business shirt. Having pressed said demounted sleeves 40, align said inseams (40a), outer edge crease, cuff plackets, cuffs, and hems facing each other, i.e. back to back or front to front.

C. On a cutting surface, using said demounted sleeve pair that was prepared in step B, position appropriate pattern 70 piece or template, so that the dotted stitching line, located on said pattern 70 piece or template, will fall directly on top of and align with the inseam 40a of said demounted sleeve pair 40. The inseam of said embodiment bottoms, should correspond with said inseam 40a of said demounted sleeve pair 40. Said pattern 70 piece or template will appear too large for said demounted sleeve pair 40 to be recycled.

D. Using said properly positioned pattern 70 piece or template as a guide, cut said crotch curve and leave enough space at the top of the said demounted sleeve pair 40 for turning down a casing or the like.

E. Sew said Crotch Curve.

F. Apply a turn down casing finish or the like, including means of cincture. Embodiment Bottom is now complete.

CAUTION: Placing said prepared demounted sleeve 40 inseam (40a) of step B, on the outside of said embodiment bottoms, causes the naturally occurring creases created during said garment construction process, to perform less desirably.

Other garments can also be recycled for the production of embodiment bottoms under the teachings of the present invention. For example, pants can be cut off and used for smaller embodiment bottoms in the same manner as demounted sleeves. Cut pant leg pairs off of pants at desired length and reconfigure said pant leg pairs using step B. C. D. E. and F of Embodiment Bottoms, from the teachings of the present invention.

Figure 8:
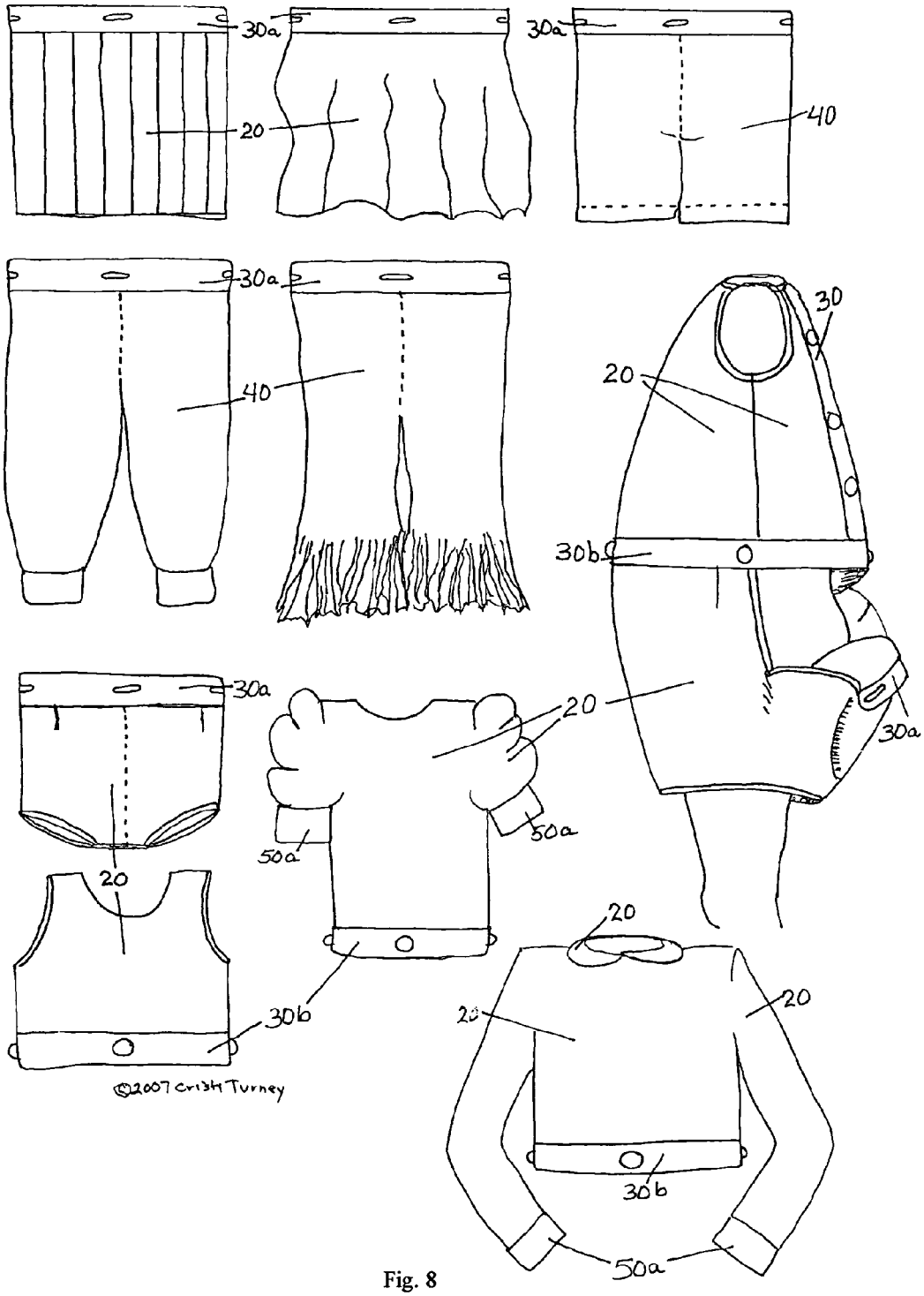
FIG. 8 shows views of demounted placket reattachment.
Figure 9:
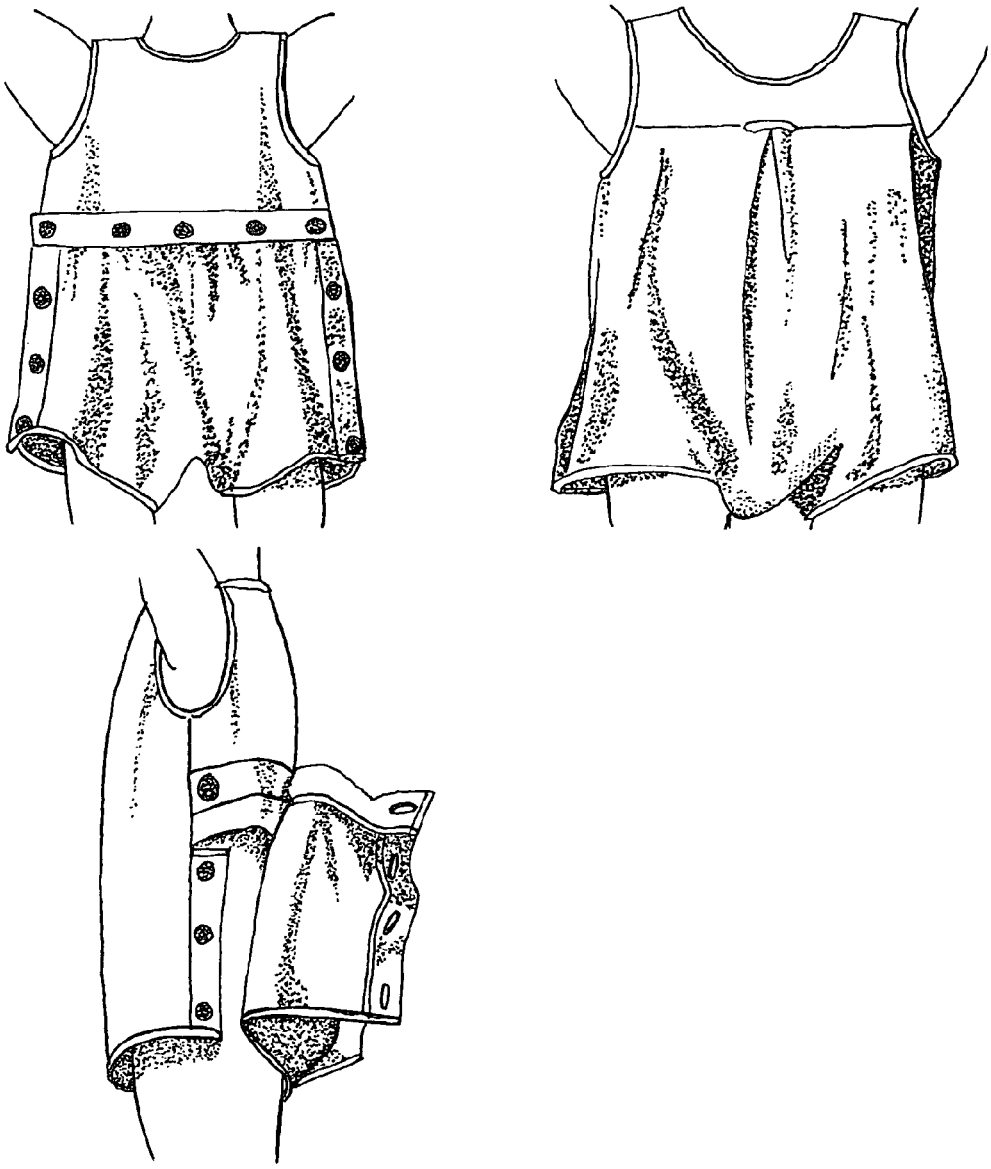
FIG. 9 shows views of embodiments having horizontal and vertical demounted placket reattachment.

Embodiment Sets: Use FIGS. 2, 8, and 9 as a Guide:

Demounted plackets 30 having a plurality of button or snap detachable fasteners can be mounted horizontally to said embodiment top and bottom creating detachably fastening embodiment sets. Said horizontal mounting of said demounted placket is one of many ways of using said demounted placket. See FIG. 9 for vertical and horizontal placement of said demounted placket. Said FIGS. 2, 8, and 9 are provided as examples only, petitioner implores said reader to understand said demounted placket potential is much broader than pictured.

A. Begin with said garment body 20 having said mounted placket 30 body side, and a partially completed Embodiment Top and partially completed Embodiment Bottom.

B. Demount said placket 30 (FIG. 2 center demounted placket 30) for the purpose of reconfiguration, leaving a seam allowance, or the like, lengthwise down both sides of said demounted placket 30. DO NOT CUT SAID PLACKET 30!

C. Completely unfasten said demounted placket 30 revealing said demounted placket 30 is composed of two corresponding members: female 30a (buttonhole member) and male 30b (button member). Set demounted placket to the side.

D. For said drop down seat in said embodiment set, create and or extend slits at the side/hips of said Embodiment Bottoms during step E of embodiment bottoms construction before or after said crotch curve colligation. Said partially completed Embodiment Top and partially completed Embodiment Bottom will be mounted or coupled with said corresponding placket members (30a and 30b) via said seam allowance or the like, creating functional embodiments, that join horizontally via button or snap detachable fasteners at the waist, hip, bust, or the like.

Said embodiment sets perform in a predictable manner. Said female placket member 30a, being mounted to the bottoms of said embodiment set, works echelon with said male placket member 30b, being mounted to the top of said embodiment set, meshing, overlapping, and engaging, enabling said plurality of button or snap detachable fasteners to attach horizontally in a detachable manner. Skirts, created from garment body 20, can also be mounted to said demounted female placket member 30a, creating skirt and shirt embodiment sets. An extended slit, for said drop-down seat, is not needed when mounting said female placket member 30a to said skirt.

Figure 10:
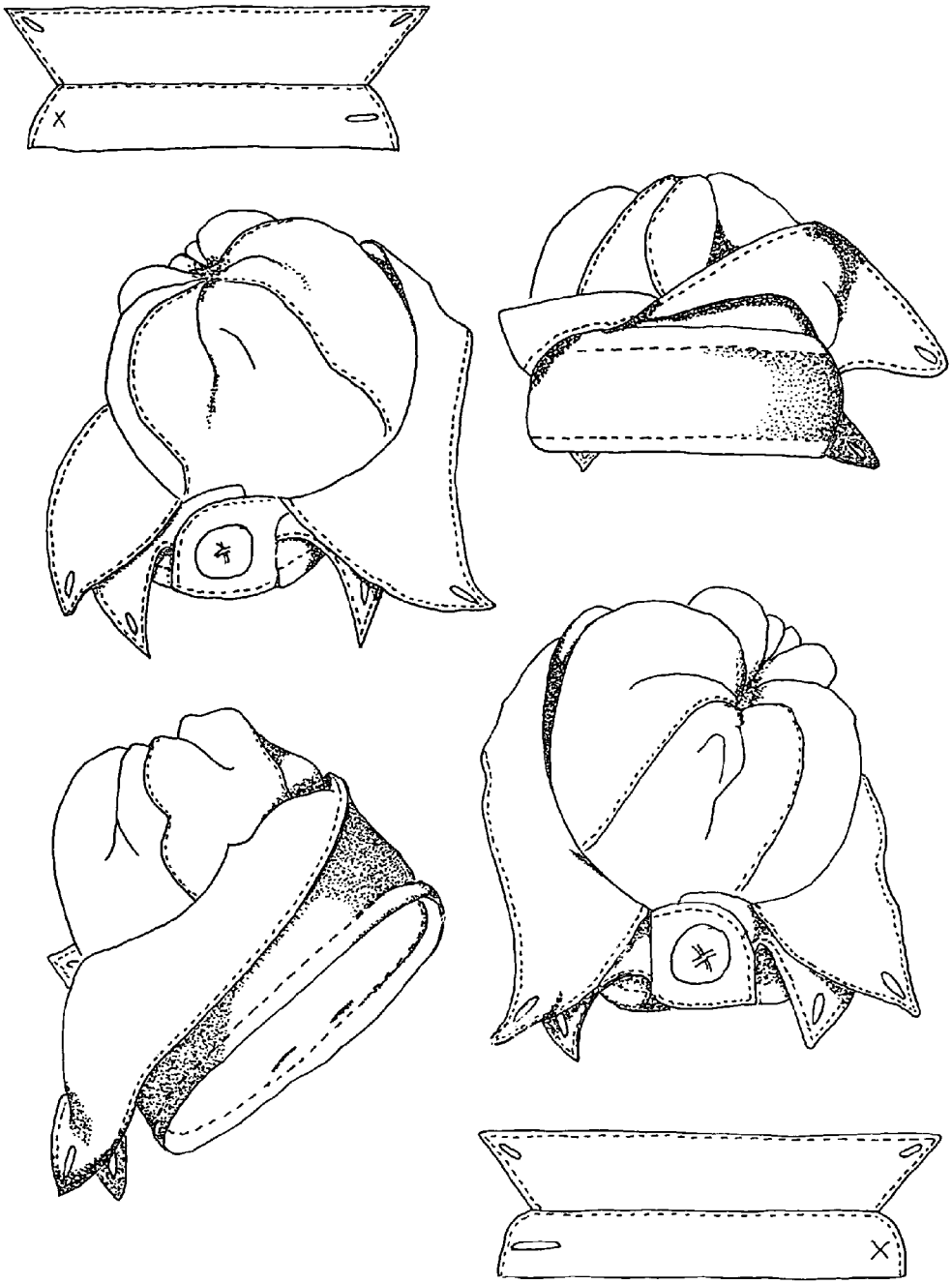
FIG. 10 shows the results of using demounted collars as hat brims.

Demounted Button-down Collars can be reconfigured to resemble: Hat Brims, Sleeve Cuff pairs, and Size Adjusters. FIGS. 2, 10, 11 and 14 are used as guide: Hat Brim: FIG. 10

A. Using nearly any garment body 20 and nearly any hat pattern 70, partially construct a hat by nearly any means, that utilizes a brim, leaving a seam allowance or the like for mounting purposes.

B. Demount said collar 50, with or without collar stand 50b from said garment body 20 leaving a seam allowance or the like.

C. Mount said product of step B. to said product of step A. of Hat Brim via said seam allowance or the like. Product of said step C. resembles a hat brim.

Petitioner used two demounted collars 50 as an example. One collar 50 has collar stand 50b attached while a contrasting demounted collar 50a, that matches the body of said product of step A. of Hat Brim, was docked from said collar stand 50b. Said mounted collars 50 of step C of Hat Brim can be moved into different positions creating a kooky look as seen in FIG. 10. In addition, FIG. 10 reveals said button-down collar stand 50b is gender specific. Said Hat Brim buttons lapping to the left (Male) and said Hat Brim buttons lapping to the right (female), perpetually differing according to the gender of said collar stand 50b being recycled.

Sleeve Cuffs: Use item 50a of collar 50 in FIG. 2 and top of FIG. 11 as a guide, A demounted button-down collar can be converted by means of cutting and sewing into tiny sleeve cuffs that mount to prepared sleeves produced by predetermined means.

A. Acquire product of step J of Embodiment Top, leaving a seam allowance or the like and create a placket or the like, for said sleeve cuff attachment.

B. Demount said button-down collar 50 from said garment body 20.

Using FIG. 9 Top Left Sequence as a Guide:

C. Dock said button-down collar 50a from said collar stand 50b, leaving seam allowance or the like for means of mounting.

D. Fold said docked collar 50a length wise aligning buttonhole tips and sides. Said fold line, which is the cutting line, will be centered between said buttonhole tips.

E. Cut said button-down collar 50a in half crosswise on said fold line. Instead of the buttonhole being centered at one end, it will be toward a pointed corner.

F. Secure and finish the edges opposite the buttonholes on said docked collar 50a. Buttons will be sewn near said finished edges opposite the buttonholes.

Figure 11:
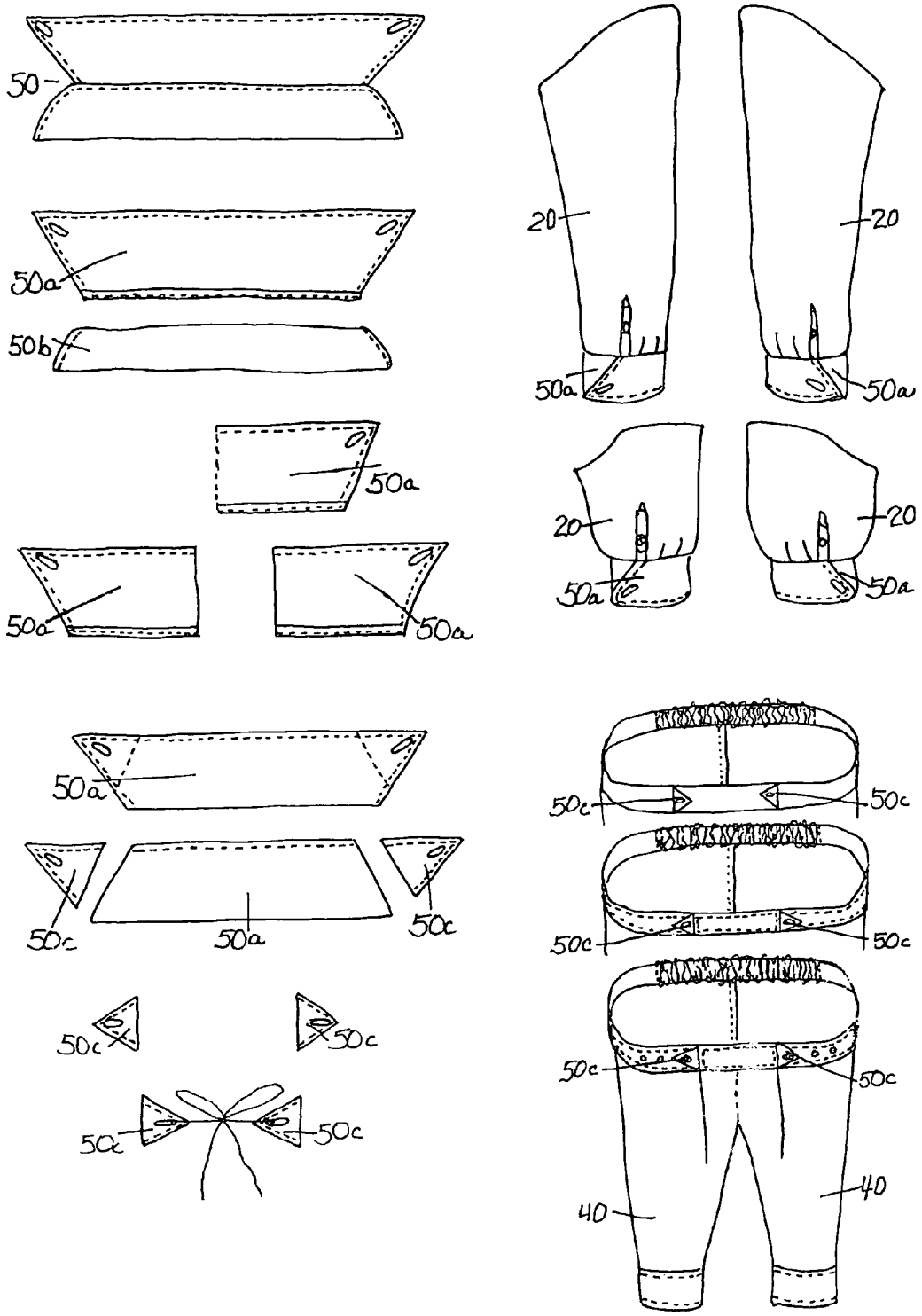
FIG. 11 shows steps for the conversion of collar parts to sleeve cuffs and size adjusters.
Figure 12:
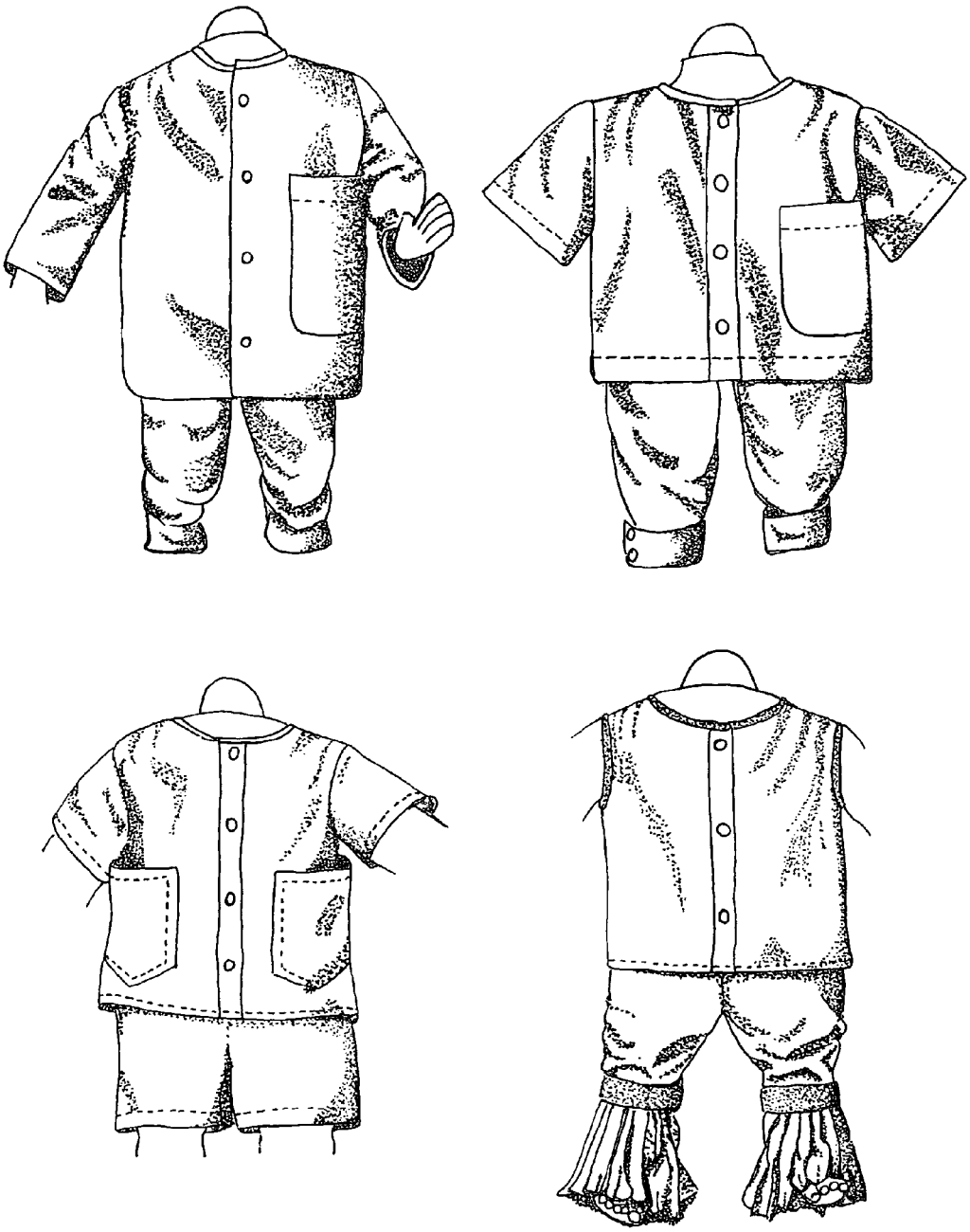
FIG. 12 shows frontal views of individual embodiment tops and bottoms being displayed in random combination.
Figure 13:
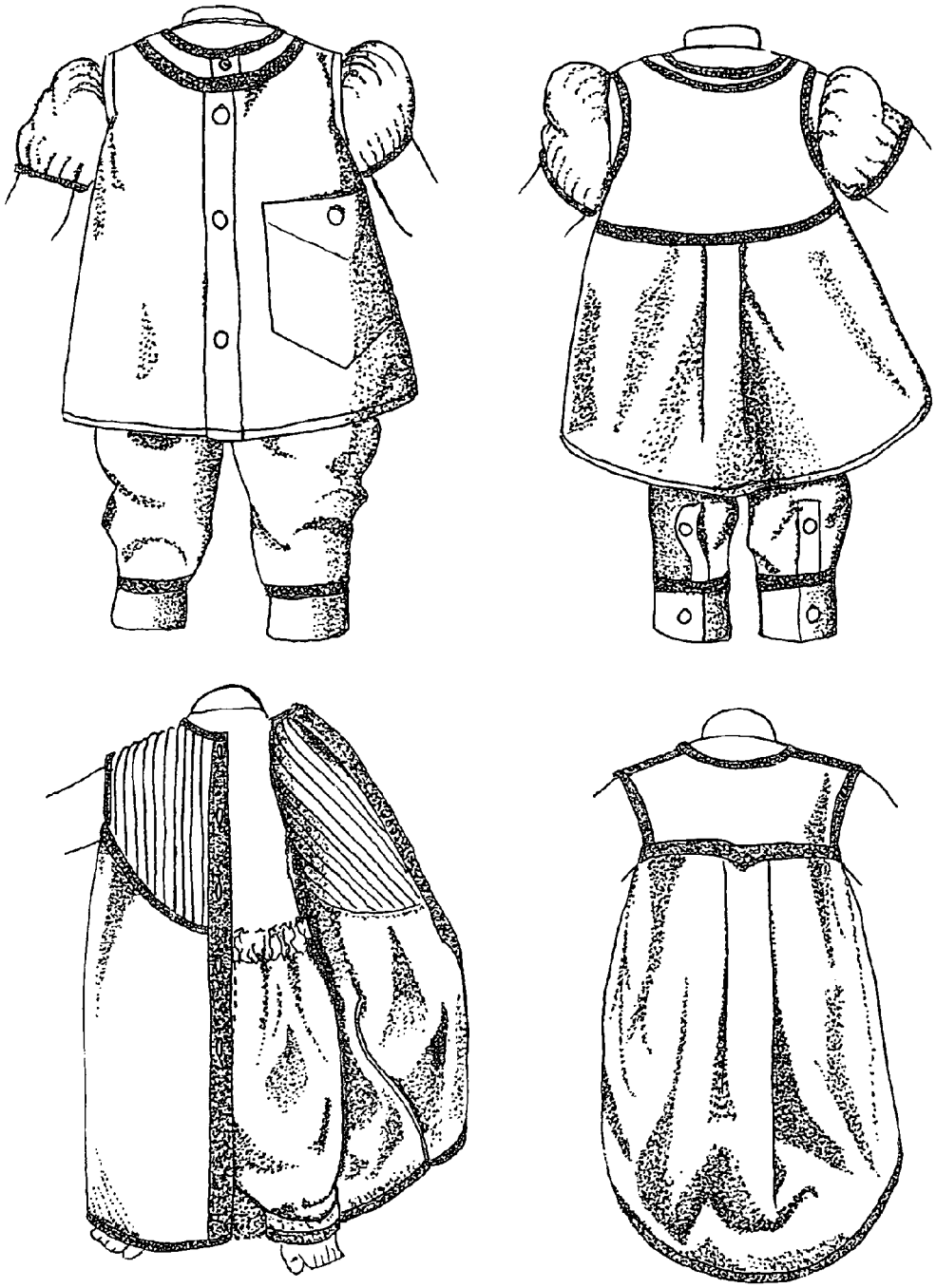
FIGS. 13 and 14 shows frontal and back views of individual embodiment tops and bottoms being displayed in random combination.
Figure 14:
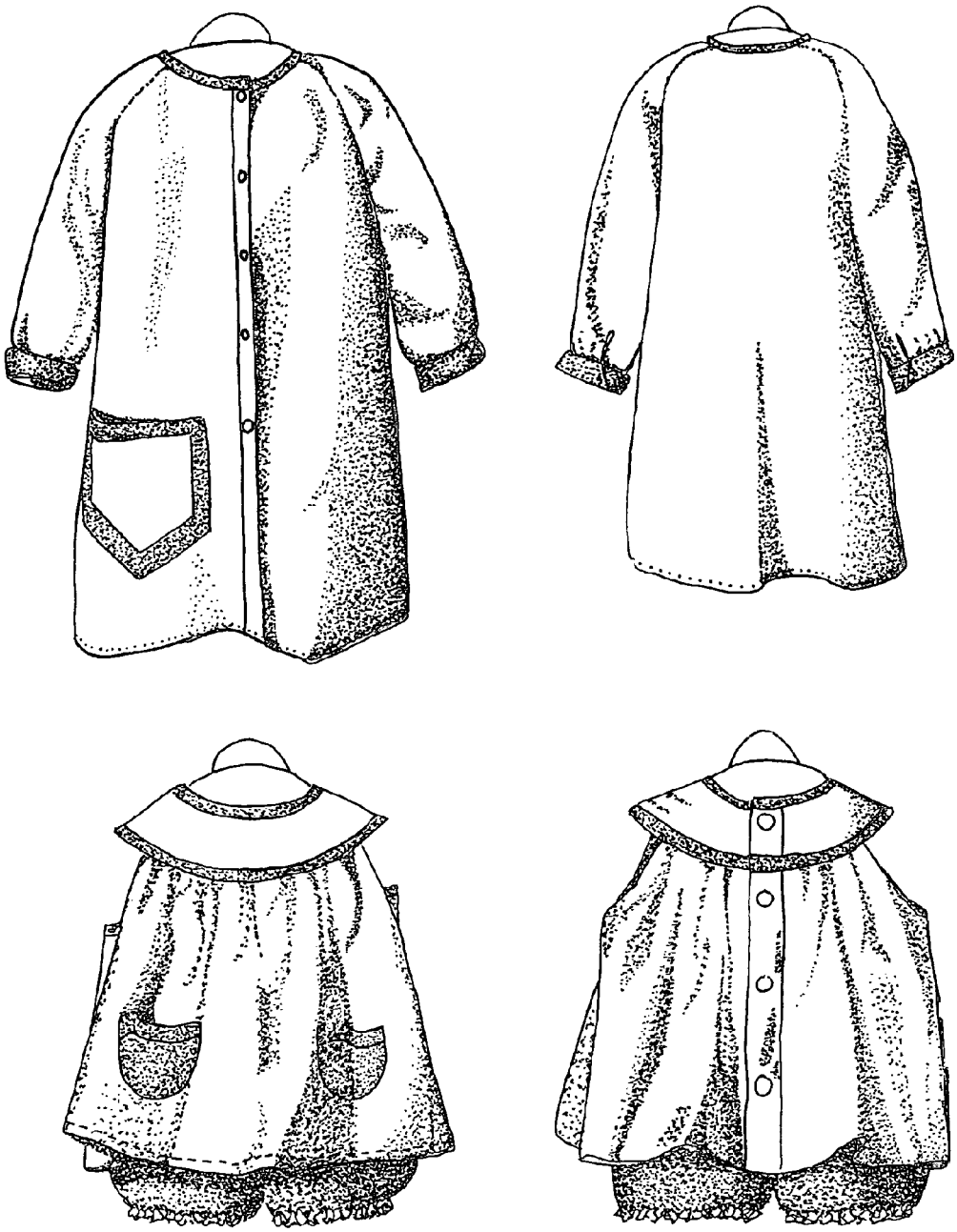

G. Mount the product of step F, Sleeve Cuffs, to the product of step A, Sleeve Cuffs, via said seam or the like. FIG. 11 top right, illustrates said sleeve cuffs mounted to said sleeves recycled from said garment Body 20 by means of cutting and colligation.

Size Adjusters: Use Bottom of FIGS. 2, and 11 as a Guide:

A Demounted button-down Collar 50 can be used for size adjustments.

Said size adjusters are to be applied to areas of said embodiment that lends itself to adjustability or is in need of cincture, or the like.

A. Acquire product F of Embodiment Bottom in preparation for the completion of steps required to reconfigure said demounted collar tips 50c.

Use Bottom Left Sequence of FIG. 11 as Guide:

B. Dock said button-down collar tip 50c from said button-down collar 50a the approximate width of the front waistband of said product of step F. of Embodiment Bottom. Said front waistband is measured vertically.

Use Bottom Right Sequence of FIG. 11 as Guide:

C. Place equally sized docked button down collar tips 50c at an equal distance from the center line of said waist band with the wrong side of said button down collar tips 50c against the right side of said front waistband. It will look like little arrows facing said center line of said front waistband.

D. Stitch on the wide end of said docked button down collar tips 50c just enough to anchor said wide end of said docked button down collar tips 50c to said center line of said front waistband.

E. Turn said docked button-down collar tips 50c over against said front waistband exposing the right side of said docked button-down collar tips 50c. Said docked button-down collar tips 50c should now be facing toward the back of said waistband. The action of turning said docked button-down collar tips 50c toward the back of said waistband creates a natural tuck on both sides of said front waistband. Said natural tuck will make it easy to employ said action of adjusting the circumference of said front waistband horizontally.

F. Use finishing means to secure said docked button down collar tips 50c to said front waistband.

G. Sew appropriate buttons directly under said docked button down collar tips 50c buttonholes and button said collar tips 50c to said front waistband.

H. Sew additional buttons equally spaced away from said buttoned button-down collar tips 50c on both sides of said front waistband, providing adjustability.

Said button-down collar tip size adjusters can also be made from the teachings of this invention, anchored on garment 10 body 20 fabric being mounted free standing in areas such as under bust, sides, sleeves, within seams or nearly any area requiring cincture or the like. Said free standing size adjuster is made of use through means of complementary buttons, or ribbon, or the like. (FIG. 11 bottom left picture)

Figure 15:
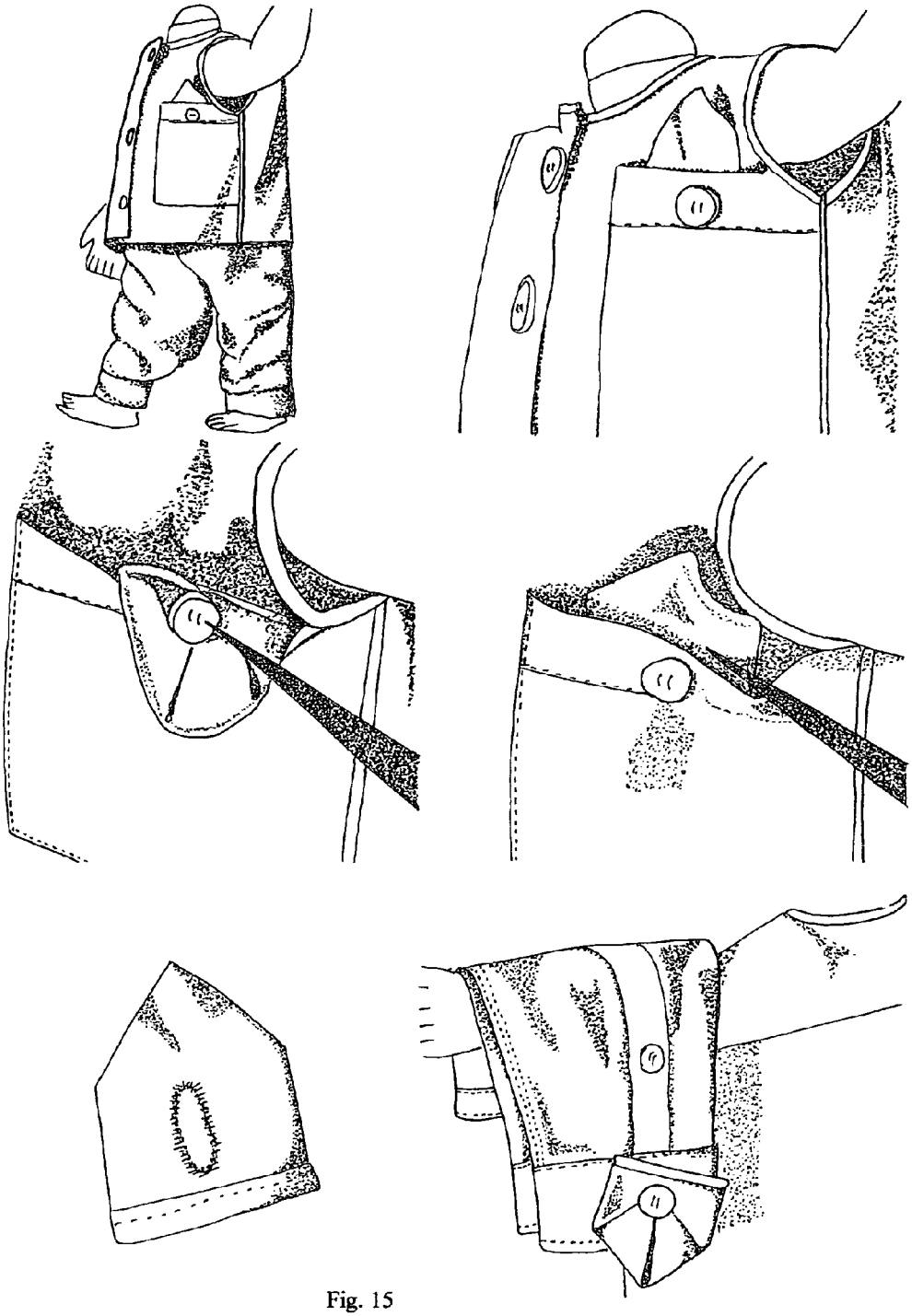
FIG. 15 shows the employment of a button and buttonhole to anchor nearly an accent, such as a hankie.

Accents FIG. 15 is used as a Guide:

Create nearly any optional accents 60 from said left over garment body 20 fabrics to coordinate with nearly any matching embodiment by construction means to resemble, for instance, a hankie or the like having means for securing purposes. A button is sewn inside said pocket, or the like, of said embodiment to anchor said accent 60. Said optional accent 60 is detachable, making washing in like colors convenient, reducing the likelihood of colors bleeding during the laundering process, which is a known liability for manufacturers. For instance, said accent 60 having a buttonhole, can be anchored to said coordinating matching embodiment via said button.

Figure 16:
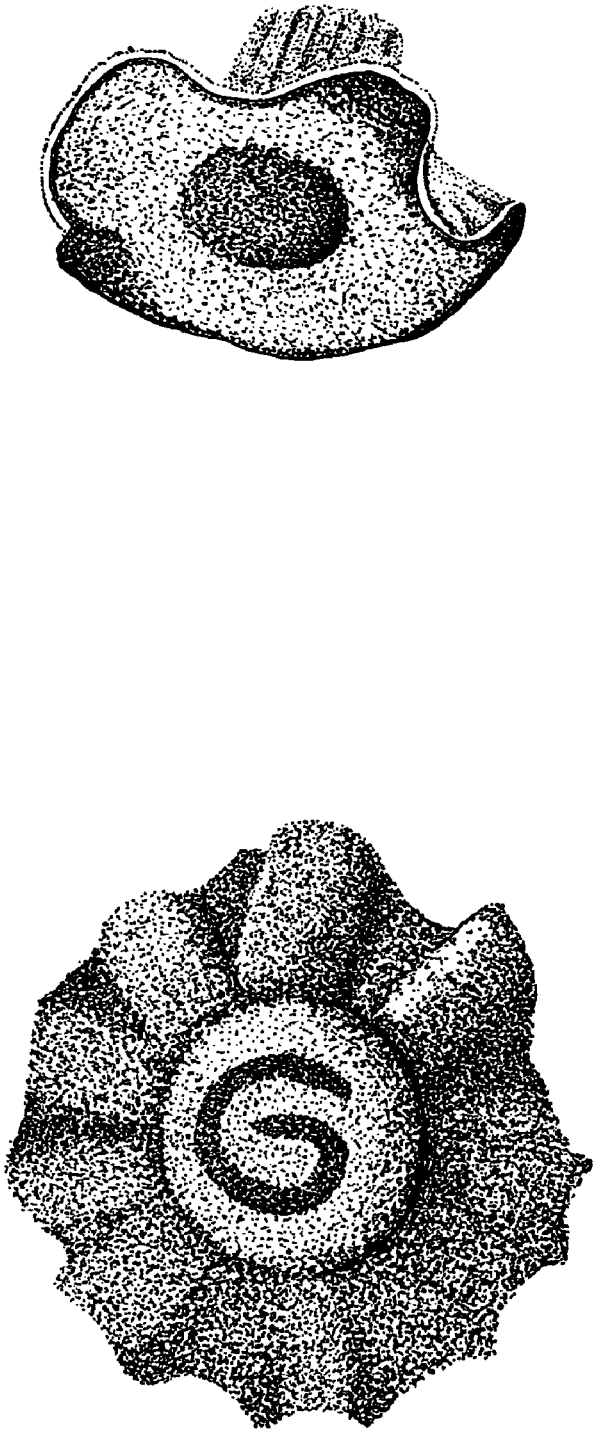
FIG. 16 shows the results of applicants method of recycling wool.

Wool garments capable of shrinkage can be recycled into embodiments that appear to be worsted wool. FIG. 16 is used as guide:

A. Begin with one of more wool garments.

B. Place an oversized pattern or template on said wool garment and cut and sew an oversized wool product according to the instructions of said oversized pattern.

C. If desired, use contrasting wool and matching thread to sew contrasting shapes, letters, or the like to said oversized wool product.

D. Shrink said oversized wool product by agitating the same in very hot water. This procedure creates embodiments that resemble nearly any hat, vest, attire or the like.

Because many varying and different embodiments may be made within the scope of the inventive concept herein taught, and because many modifications may be made in the embodiment (s) herein detailed in accordance with the descriptive requirements of the law, it is to be understood that the details herein are to be interpreted as illustrative and not in a limiting sense.

While the above description contains many specificities, these should not be construed as limitations on the scope of the invention, but exemplifications of the presently preferred embodiments thereof. Many other ramifications and variations are possible within the teachings of the invention. For instance, a dress shirt was used for presenting petitioners drawings. Although the use of said dress shirt is beneficial for an understanding of the petitioners invention, nearly any garment, or demounted garment part will function well using petitioners process of recycling garments. In addition, said embodiments are often presented in pairs or groups or outfits. Said process of recycling and resulting preferred embodiments thereof are completely interchangeable having no set rules of usage.

Thus, the scope of the invention should be determined by the appended claims and their legal equivalents, and not by the examples given.

The invention claimed is:

1. A method of converting existing clothing into a new [apparel] garment, the method comprising [the steps of]:

aligning a first template over a predetermined piece of an existing garment, *wherein* the predetermined garment piece *is* selected from the group [comprising:] *consisting of* a garment body, placket with or without collar stand, [yokes] *yoke*, [embellishments] *embellishment*, collar, [sleeves] *sleeve*, [seams] *seam*, [hems] *hem*, [or waistbands] *and waistband*;

[utilizing the first template as a guide to mark center lines and areas designated for cutting;

said] *and*

*wherein the* first template *is* sized to provide excess material at the sides of the cut [pieces] *piece* for forming a seam allowance;

cutting around the first template on the existing garment to form a first new pattern piece[;],

*wherein* the first new pattern piece includes at least one intact portion of the predetermined piece of the existing garment;

removing the first new pattern piece from the existing garment for [rejoining at a later step] *later joining*;

aligning a second template over a predetermined piece of the existing garment, *wherein* the predetermined garment piece *is* selected from the group [comprising:] *consisting of* a garment body, placket with or without collar stand, [yokes] *yoke*, [embellishments] *embellishment*, collar, [sleeves] *sleeve*, [seams] *seam*, [hems] *hem*, [or waistbands] *and waistband*;

[utilizing the second template as a guide to mark the center lines and areas designated for cutting;]

*wherein* the second template *is* sized to provide excess material at the sides of the cut piece for forming a seam allowance;

cutting around the second template on the existing garment to form a second new pattern piece[;],

*wherein* the second new pattern piece includes at least one intact portion of the predetermined [pieces] *piece* of the existing garment;

[preparing the first and second new pattern pieces for connection,]

*removing the second new pattern piece from the existing garment for later joining;* aligning the first and second new pattern pieces, such that the excess material reserved for seam allowances are aligned;

joining the first and second new pattern pieces [by stitching, thereby creating a new garment];

[heming the raw edges of the new garment creating finished edges;]

and [whereby said joining of the first and second new pattern pieces form said new garment wherein the] *forming a* new garment [is] selected from the group [comprising of:] *consisting of* [shirts] *shirt*, trousers, [skirts] *skirt*, [or hats] *and hat* for use by a wearer.

*2. The method of claim 1, wherein the first predetermined garment piece is a garment body with or without placket; wherein the second predetermined garment piece is a garment body with or without placket; and wherein the first and second new pattern pieces are joined by stitching, thereby creating a new garment selected from shirt and skirt.*

*3. The method of claim 2, wherein the new garment is a shirt and wherein the method further comprises joining one or more sleeves.*

*4. The method of claim 1, wherein the first predetermined garment piece is a demounted sleeve; wherein the second predetermined garment piece is a demounted sleeve; and wherein the first and second new pattern pieces are joined by stitching, thereby creating trousers.*

*5. The method of claim 4, wherein the first template and the second template are the same.*

*6. The method of claim 4, wherein the first template and the second template are different.*

*7. The method of claim 4, further comprising applying a turn down casing to form a waistband.*

*8. The method of claim 1, wherein the first predetermined garment piece is a garment body; wherein the second predetermined garment piece is a collar with or without a collar stand; and wherein the first and second new pattern pieces are joined by stitching, thereby creating a hat.*

*9. The method of claim 8, further comprising joining a third predetermined garment piece, wherein the third predetermined garment piece is a collar without or without a collar stand.*

*10. The method of claim 1, further comprising hemming the new garment.*

*11. The method of claim 2, wherein the placket is on the front of the garment body, the back of the garment body, a side of the garment body, or across the shoulders of the garment body.*

*12. The method of claim 1, wherein the placket comprises one or more buttons, one or more fasteners, or a zipper.*

*13. A method of making a garment, the method comprising:*

*aligning a first template over a predetermined piece of a first existing garment,*

*wherein the predetermined garment piece is selected from the group consisting of a garment body, placket with or without collar stand, yoke, embellishment, collar, sleeve, seam, hem, and waistband,*

*wherein the first template is sized to provide excess material at the sides of the cut piece for forming a seam allowance;*

*cutting around the first template on the first existing garment to form a first new pattern piece;*

*wherein the first new pattern piece includes at least one intact portion of the predetermined piece of the first existing garment;*

*removing the first new pattern piece from the first existing garment for later joining;*

*aligning a second template over a predetermined piece of a second existing garment,*

*wherein the predetermined garment piece is selected from the group consisting of a garment body, placket with or without collar stand, yoke, embellishment, collar, sleeve, seam, hem, and waistband,*

*wherein the second template is sized to provide excess material at the sides of the cut piece for forming a seam allowance;*

*cutting around the second template on the second existing garment to form a second new pattern piece,*

*wherein the second new pattern piece includes at least one intact portion of the predetermined piece of the second existing garment,*

*removing the second new pattern piece from the second existing garment for later joining;*

*aligning the first and second new pattern pieces such that the excess material reserved for seam allowances are aligned;*

*joining the first and second new pattern pieces; and*

*forming a garment, wherein the garment is a dress.*

*14. The method of claim 13, further comprising joining one or more sleeves to the dress.*

*15. The method of claim 13, wherein the first existing garment and the second existing garment are different garments.*

*16. The method of claim 13, wherein the first existing garment and the second existing garment are the same garment.*

*17. The method of claim 13, further comprising hemming the new garment.*

*18. The method of claim 13, wherein the first predetermined garment piece is a garment body with or without placket; and wherein the second predetermined garment piece is a garment body with or without placket.*

*19. The method of claim 18, wherein the placket is on the front of the garment body, the back of the garment body, a side of the garment body, or across the shoulders of the garment body.*

*20. The method of claim 13, wherein the placket comprises one or more buttons, one or more fasteners, or a zipper.*

* * * * *